(12) United States Patent
Krahnstoever et al.

(10) Patent No.: US 7,356,425 B2
(45) Date of Patent: Apr. 8, 2008

(54) METHOD AND SYSTEM FOR CAMERA AUTOCALIBRATION

(75) Inventors: Nils Oliver Krahnstoever, Albany, NY (US); Paulo Ricardo Mendonca, Clifton Park, NY (US); Jens Rittscher, Schenectady, NY (US); Thomas Baby Sebastian, Flemington, NJ (US); Peter Henry Tu, Schenectady, NY (US)

(73) Assignee: GE Security, Inc., Brandenton, FL (US)

( * ) Notice: Subject to any disclaimer, the term of this patent is extended or adjusted under 35 U.S.C. 154(b) by 0 days.

(21) Appl. No.: 11/296,743

(22) Filed: Dec. 7, 2005

(65) Prior Publication Data

US 2006/0215031 A1    Sep. 28, 2006

Related U.S. Application Data

(60) Provisional application No. 60/661,540, filed on Mar. 14, 2005.

(51) Int. Cl.
*G06F 19/00* (2006.01)

(52) U.S. Cl. .......................................................... 702/94
(58) Field of Classification Search .................... 702/94
See application file for complete search history.

(56) References Cited

U.S. PATENT DOCUMENTS

| 6,594,600 | B1 * | 7/2003 | Arnoul et al. ................. 702/94 |
| 6,950,123 | B2 * | 9/2005 | Martins ....................... 348/157 |
| 7,015,952 | B2 * | 3/2006 | Okada ...................... 348/208.1 |
| 2004/0119716 | A1 * | 6/2004 | Park et al. ................... 345/473 |
| 2005/0073585 | A1 * | 4/2005 | Ettinger et al. ............. 348/155 |
| 2005/0134685 | A1 * | 6/2005 | Egnal et al. ................. 348/157 |

* cited by examiner

*Primary Examiner*—John Barlow
*Assistant Examiner*—Jonathan Moffat
(74) *Attorney, Agent, or Firm*—Eugene Hyun, Esq.; Armstrong Teasdale LLP (57) ABSTRACT

A method for calibrating a projective camera is provided. The method includes acquiring information by detecting at least one object on a substantially flat ground plane within a field of view. A projective camera calibration is performed. A measurement uncertainty is considered to yield a plurality of camera parameters from the projective camera calibration.

19 Claims, 4 Drawing Sheets

METHOD AND SYSTEM FOR CAMERA AUTOCALIBRATION

CROSS REFERENCE TO RELATED APPLICATIONS

This application claims the benefit of U.S. Provisional Application No. 60/661,540, filed Mar. 14, 2005, which is hereby incorporated by reference in its entirety.

BACKGROUND OF THE INVENTION

This invention relates generally to visual surveillance and, more particularly, to a method and system for projective camera calibration.

In the context of visual surveillance of human activity, for example, knowledge about a camera's internal and external parameters is useful, as it allows for the establishment of a connection between image and world measurements. Unfortunately, calibration information is rarely available and difficult to obtain after a surveillance system has been installed.

The connection between image measurements and scene measurements in metric space is greatly simplified when intrinsic and extrinsic parameters of the camera are available. The two general approaches to establish these parameters are known as camera calibration, wherein extensive knowledge of the scene geometry must be available, and camera autocalibration, wherein knowledge of the camera motion and rigidity of a scene, rather than knowledge of the scene geometry, is required.

Conventional surveillance systems have dealt with small amounts of measurement noise and outliers using an estimation that, in practice, quickly breaks down when the noise reaches significant levels.

BRIEF DESCRIPTION OF THE INVENTION

In one aspect, the present invention provides a method for calibrating a projective camera. The method includes acquiring information by detecting at least one object on a substantially flat ground plane within a field of view. A projective camera calibration is performed and a measurement uncertainty is considered to yield a plurality of camera parameters from the projective camera calibration.

In another aspect, a method for calibrating a projective camera is provided. The method includes acquiring image data by detecting at least one object on a ground plane within a field of view. A foot-to-head homography is determined and a projective camera matrix for the projective camera is recovered.

In another aspect, the present invention provides a surveillance system. The surveillance system includes an object detector configured to process a video stream and report a rectangular foreground region. A processor is configured to process the reported foreground region to extract a foot location estimate on a ground plane and a corresponding head location estimate. The process is further configured to perform a projective camera calibration and yield a plurality of camera parameters from the projective camera calibration.

DETAILED DESCRIPTION OF THE INVENTION

The present invention provides a method and system for automatically calibrating a projective camera for a surveillance system based on information gathered by detecting objects, such as at least one person, along a ground plane. Calibration parameter measurements are obtained by utilizing a foot-to-head plane homology. Initial parameters can then be efficiently estimated from these calibration parameter measurements. A Bayesian solution, which is capable of handling measurement uncertainties, outliers and prior information, is utilized to solve conventional calibration problems dealing with noise analysis. Further, given the calibration parameter measurements, a full posterior distribution of calibration parameters can be accurately estimated.

Figure 1:
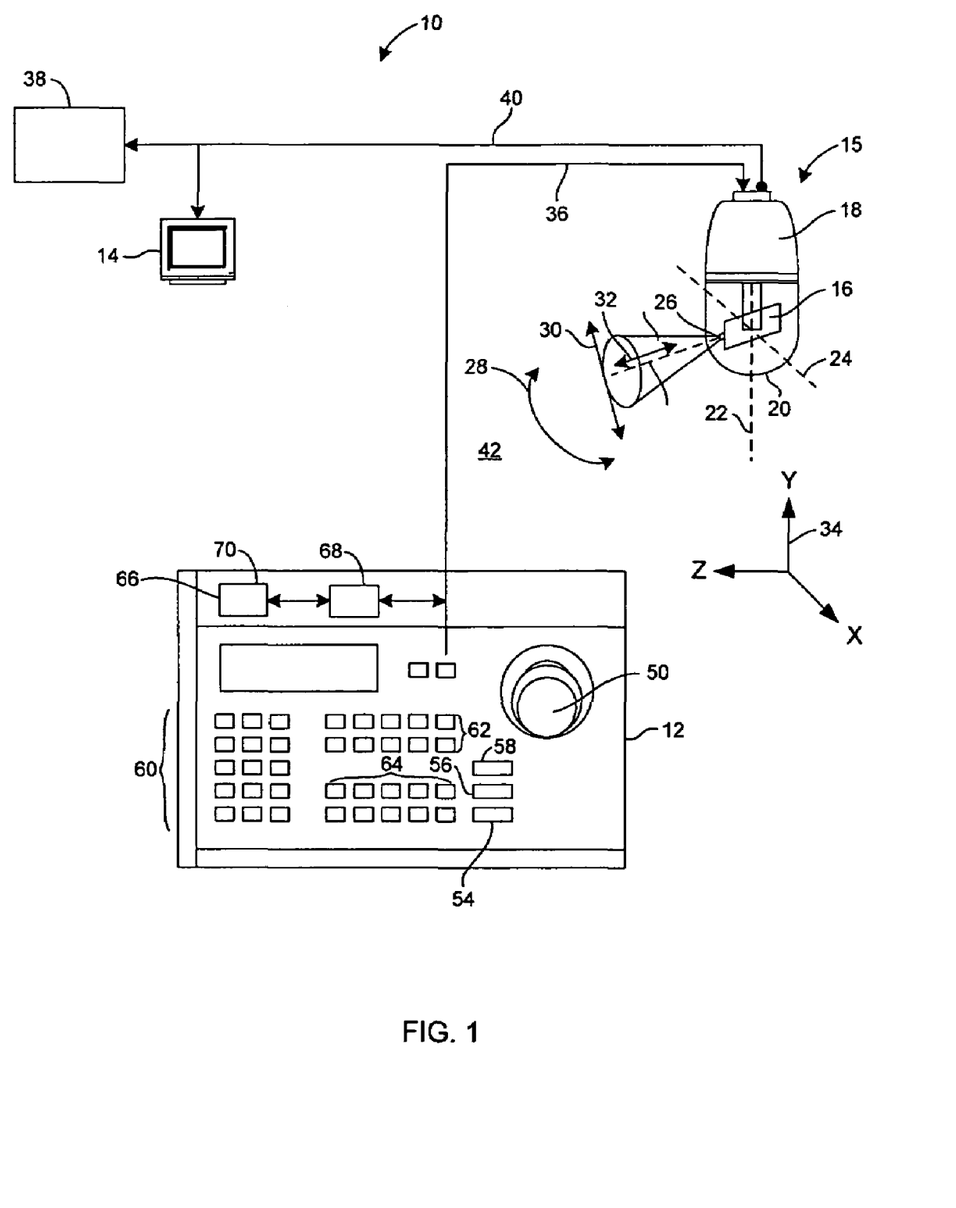
FIG. 1 is a schematic view of an exemplary video surveillance system.

FIG. 1 is a schematic view of an exemplary video surveillance system 10 in accordance with one embodiment. Video surveillance system 10 includes a control panel 12, a display monitor 14, and a video camera assembly 15. In one embodiment, video camera assembly 15 includes a fixed projective camera 16 that is housed in an enclosure 18 having a dome 20 for protecting camera 16 from the environment where camera 16 is located. In one embodiment, dome 20 is tinted to allow camera 16 to acquire images of the environment outside of enclosure 18 and simultaneously prevent individuals in the environment being observed by camera 16 from determining the orientation of camera 16. In an alternative embodiment, dome 20 is not tinted.

In an alternative embodiment, camera 16 is a pan/tilt/zoom (PTZ) camera that is configured to pan about a vertical axis 22, tilt about a horizontal axis 24, and control a lens assembly 26 to cause camera 16 to zoom. For example, pan/tilt/zoom video camera assembly 15 includes a pan motor and encoder (not shown) and tilt motor and encoder (not shown). The encoders determine an angular position of the pan and tilt motor and generate position signals that are used with a zoom setting to determine an area in the field of view. Panning movement of camera 16 is represented by arrow 28, tilting movement of camera 16 is represented by arrow 30 and the changing of the focal length of lens assembly 26 of camera 16, i.e., zooming, is represented by arrow 32. As shown with reference to a coordinate system 34, panning motion tracks movement along the x-axis, titling motion tracks movement along the y-axis and focal length adjustment is used to track movement along the z-axis. Signals representing commands to control such capabilities are transmitted from control panel 12 through a control data line 36. Image data signals are transmitted from camera 16 to display monitor 14 and a storage device 38 through a video data line 40.

Lens assembly 26 views an area of a location 42, which may be remote from control panel 12 and is in a field of view 44 and along a viewing axis 46 of lens assembly 26. Images of location 42 are converted by camera 16 into an electrical video signal, which is transmitted to display monitor 14.

In one embodiment, control panel 12 includes a X-Y control joystick 50 that is used to generate pan and tilt commands. A plurality of rocker-type switches 52 are used to control a zoom 54, a focus 56, and an iris 58 of lens assembly 26. In an alternative embodiment, joystick 50 includes a twist actuation that is used to control the zoom of camera 16. Joystick 50 may also incorporate triggers and/or buttons to facilitate operating various controls associated with system 10. Control panel 12 also includes a numeric keypad 60 for entering numbers and values. In an alternative embodiment, control panel 12 includes an alpha or alphanumeric keypad (not shown) for entering text as well as numbers. Control panel 12 further includes a plurality of preset switches 62 that may be programmed to execute macros that automatically control the actions of camera 16 and/or lens assembly 26. A plurality of buttons 64 are used for predetermined control functions and/or user-defined functions, such as a camera selection in a multi-camera video surveillance system. A display 66 may be used to display a status of video surveillance system 10 or may be used to display parameters associated with a selected camera.

A processor 68 receives programmed instructions, from software, firmware and data from memory 70 and performs various operations using the data and instructions. Processor 68 may include an arithmetic logic unit (ALU) that performs arithmetic and logical operations and a control unit that extracts instructions from memory 70 and decodes and executes the instructions, calling on the ALU when necessary. Memory 70 generally includes a random-access memory (RAM) and a read-only memory (ROM). However, there may be other types of memory such as programmable read-only memory (PROM), erasable programmable read-only memory (EPROM) and electrically erasable programmable read-only memory (EEPROM). In addition, memory 70 may include an operating system, which executes on processor 68. The operating system performs basic tasks that include recognizing input, sending output to output devices, keeping track of files and directories and controlling various peripheral devices.

As used herein, references to "processor" are to be understood to refer to central processing units, microprocessors, microcontrollers, reduced instruction set circuits (RISC), application specific integrated circuits (ASIC), logic circuits and any other circuit or processor capable of executing the functions described herein. Memory 70 may include storage locations for the preset macro instructions that may be accessible using one of the plurality of preset switches 52.

As used herein, references to "software" and "firmware" are interchangeable, and are to be understood to refer to and include any computer program stored in memory for execution by processor 68, including RAM memory, ROM memory, EPROM memory, EEPROM memory, and nonvolatile RAM (NVRAM) memory. The above memory types are exemplary only, and are thus not limiting as to the types of memory usable for storage of a computer program.

In various embodiments, processor 68 and memory 70 are located external to camera 16 such as in control panel 12 or in a PC or other standalone or mainframe computer system capable of performing the functions described herein. In one embodiment, video images are transferred to memory 70 or digitized using "frame grabbers."

In the exemplary embodiment, video surveillance system 10 is a single camera application, however, various embodiments of the present invention may be used within a larger surveillance system having additional cameras which may be either stationary or moveable cameras or some combination thereof to provide coverage of a larger or more complex surveillance area. In an alternative embodiment, one or more video recorders (not shown) are connected to control panel 12 to provide for recording of video images captured by camera 16 and other cameras in system 10.

Figure 2:
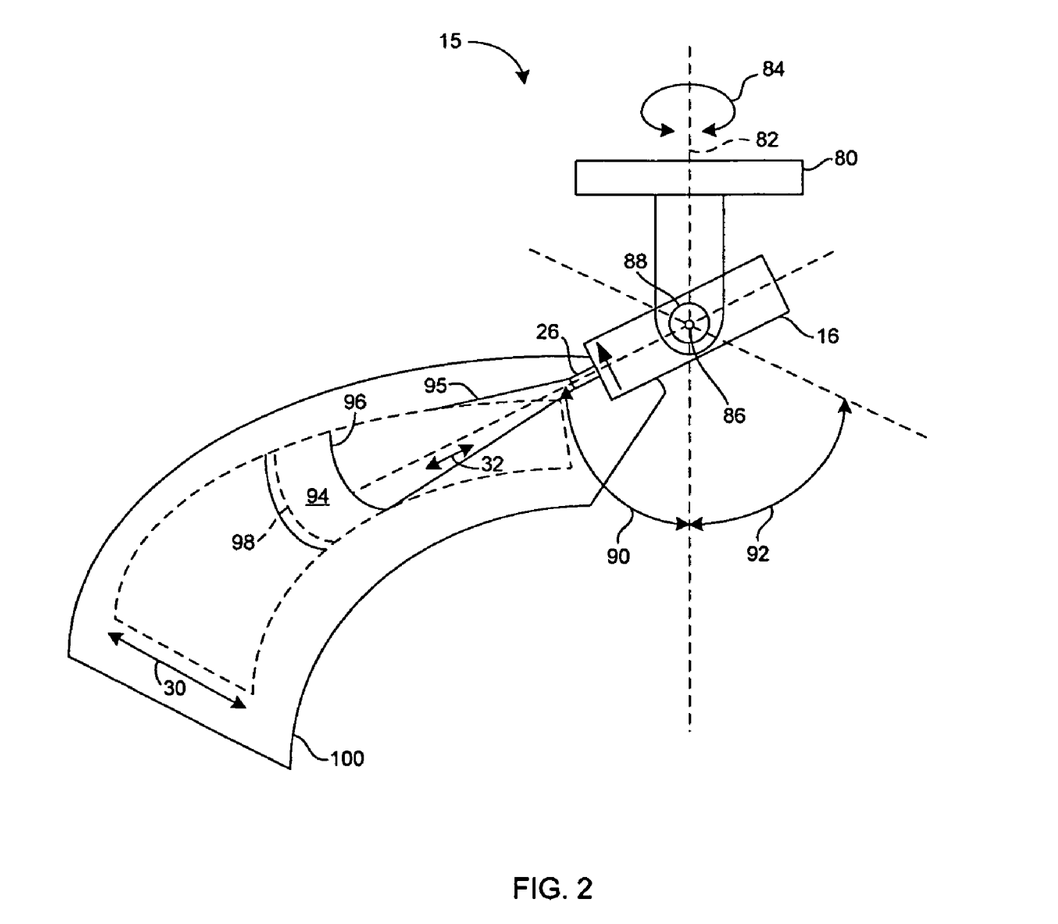
FIG. 2 is a schematic view of an exemplary embodiment of a pan/tilt/zoom video camera assembly shown in FIG. 1.

FIG. 2 is a schematic diagram of an exemplary embodiment of pan/tilt/zoom video camera assembly 15 shown in FIG. 1. Pan/tilt/zoom video camera assembly 15 includes a camera 16, a pan mechanism 80 that is configured to rotate the video camera about a pan axis 82 in a clockwise and a counter clockwise pan direction 84. In the exemplary embodiment, pan mechanism 80 is configured to pan continuously about pan axis 82. In an alternative embodiment, pan mechanism 80 is configured to pan less than a full rotation about pan axis 82. Pan/tilt/zoom video camera assembly 15 also includes a tilt mechanism 86 coupled to pan mechanism 80 and configured to rotate video camera 16 about a tilt axis 88 (illustrated normal to the figure). In one embodiment, tilt mechanism 86 is configured to rotate camera 16 about tilt axis 88 greater than ninety degrees through an angle 90 and an angle 92 with respect to pan axis 82. In such embodiment, the total tilt of camera 16 is greater than one hundred eighty degrees. A controller, such as control panel 12, is communicatively coupled to pan mechanism 80 and tilt mechanism 86. Control panel 12 is configured to receive a first image of a view acquired from a first address wherein the address indicates a pan rotation angle with respect to an index, such as an initial starting or "parked" position. The address also indicates a tilt angle with respect to pan axis 82, and a zoom setting of lens assembly 26. In the exemplary embodiment, when camera 16 is rotated about tilt axis 88 through zero degrees with respect to pan axis 82, for example camera 16 is oriented pointing vertically downward, the video image is electronically flipped, such that the image, as perceived by the user, is oriented right side up.

In one embodiment, a view 94 is the area within the field of view of camera 16 at a particular address, for example, at a pan angle, tilt angle, and zoom setting. An image is acquired of view 94 by camera 16. The image may be stored, displayed, processed for enhancement and/or combined with other images. In one embodiment, images of adjacent views are registered with respect to objects within each image and combined to form a larger panoramic image of multiple views. The images may be registered edge to edge 96 or may include an area of overlap 98 to facilitate registering the images. In one embodiment, a panoramic motion detection area 100 includes a plurality of views 94 contiguously oriented about the field of view of camera 16. In an alternative embodiment, views 94 are not contiguously oriented. During calibration, PTZ cameras have to be kept fixed. If the PTZ camera is moved, i.e., panned and/or tilted, the PTZ camera will need to be recalibrated.

Figure 3:
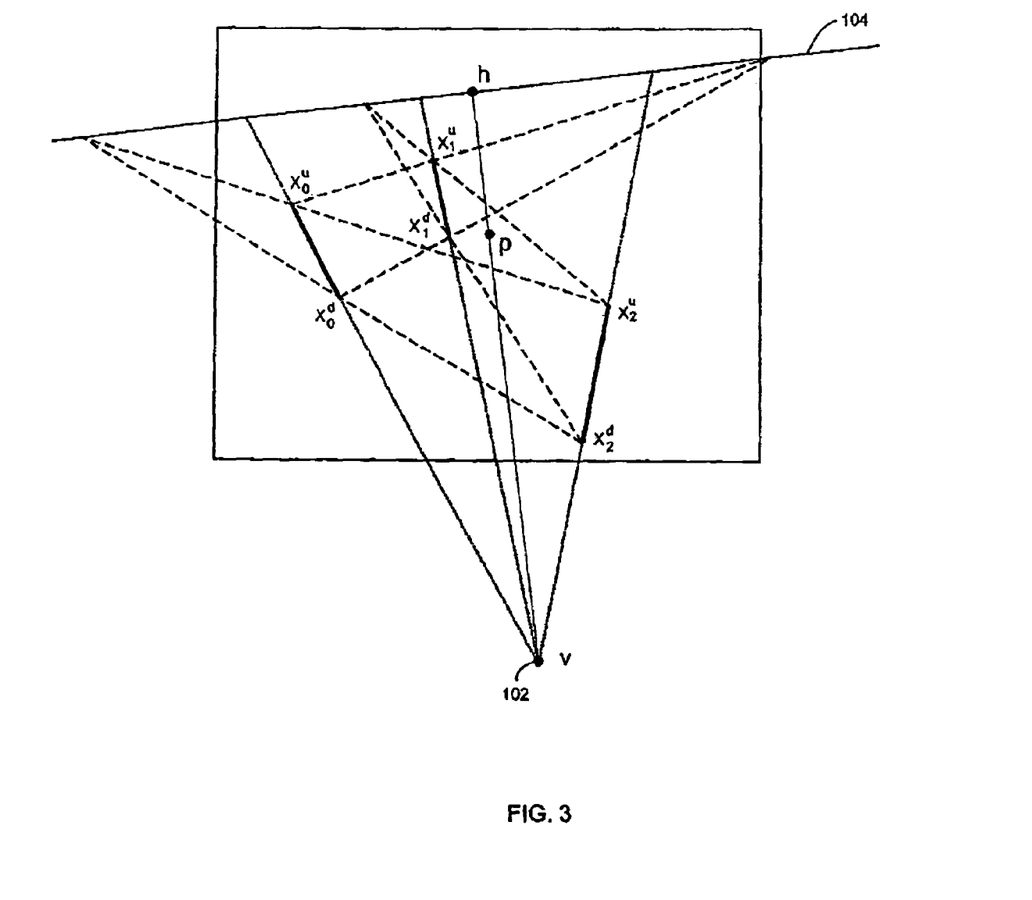
FIG. 3 shows a geometric relationship between observations of people, the horizon line, the vanishing point and the principal point.
Figure 4:
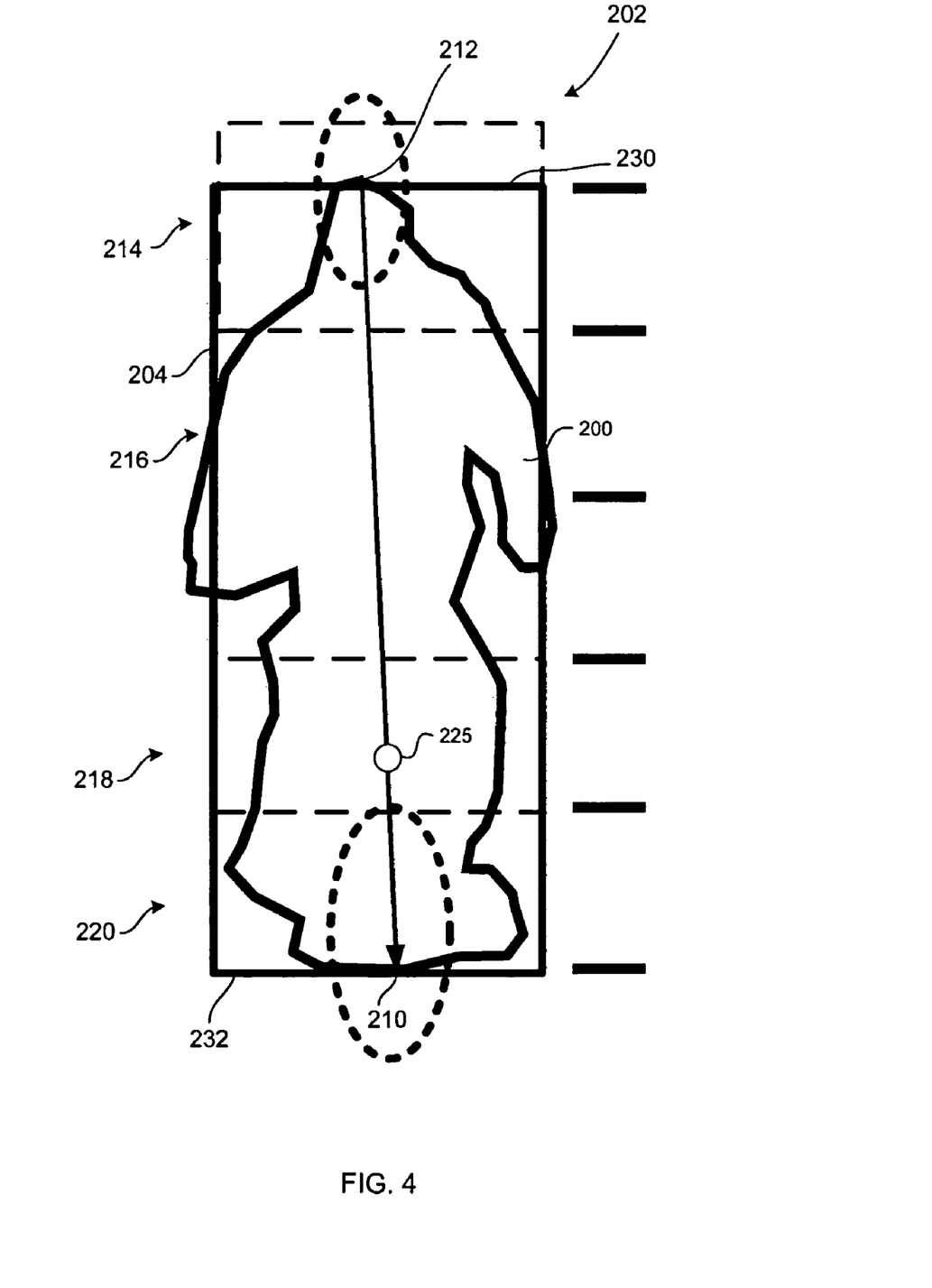
FIG. 4 is a schematic view of an image of a person within a foreground region.

Referring to FIG. 3, the present invention provides a method and system for calibrating projective camera 16. FIG. 3 shows the geometric relationship between observations or detections of objects, such as people, the horizon line, h, the vanishing point, v, and the principal point p. In one embodiment, a single image is tailored using the auto-calibration method of the present invention for applications in visual surveillance of people under the assumption that the scene is well modeled by a dominant ground plane that defines the horizon and on which people are essentially vertical segments of constant height. These line segments are parallel and, in projective space intersect in a point of infinity, the image of which is a vanishing point, v, 102. In addition, all lines connecting the upper points of pairs of segments and lower points of the same pair are also parallel and their images intersect at the image of the scene horizon, or the horizon line, h, 104. Knowledge of vanishing point 102 and horizon line 104 places three constraints on camera 16. Under the common assumptions of zero skew, unit aspect ratio and known principal point, the camera focal length can be estimated, making metric reconstruction, with a modulus as an overall scale factor or a known person height to fix the scale, possible. Under the additional assumption of a known constant height of people, the overall scale factor is also determined.

Under the assumption of zero skew, unit aspect ratio and known principal point—which, without loss of generality can be taken as having Cartesian coordinates (0, 0)—the matrix of intrinsic parameters of projective camera 16 is given by:

$$K = \begin{bmatrix} f & 0 & 0 \\ 0 & f & 0 \\ 0 & 0 & 1 \end{bmatrix} \quad \text{(Eq. 1)}$$

Since the world coordinate system can be setup arbitrarily, the projective camera matrix P is then given by:

$$P = KR[I|-c] \quad \text{(Eq. 2)}$$

with $$R = R_\rho^z R_\theta^x \quad \text{(Eq. 3)}$$

$$= \begin{bmatrix} \cos(\rho) & -\sin(\rho) & 0 \\ \sin(\rho) & \cos(\rho) & 0 \\ 0 & 0 & 1 \end{bmatrix} \begin{bmatrix} 1 & 0 & 0 \\ 0 & \cos(\theta) & -\sin(\theta) \\ 0 & \sin(\theta) & \cos(\theta) \end{bmatrix}$$

and c=[0, 0, z]. A positive roll corresponds to a counter-clockwise rotation of camera 16 and hence a clock-wise rotation of the horizon.

The vanishing point $\tilde{v}^\infty$ is the image of the point $\tilde{V}^\infty=[0, 0, 1, 0]$ at infinity. Given a general projective matrix P=[$p_0$, $p_1$, $p_2$, $p_3$], $\tilde{v}^\infty=p_2$. The image $\tilde{v}^\infty$ is given by:

$$\tilde{v}^\infty = [f\sin(\rho)\sin(\theta) -f\cos(\rho)\sin(\theta)\cos(\theta)] \quad \text{(Eq. 4)}$$

that can be written in Cartesian coordinates as:

$$v^\infty = -f\tan\theta[\sin(-\rho)\cos(-\rho)]. \quad \text{(Eq. 5)}$$

for $\theta \neq \pi/2$. The vanishing point $\tilde{v}^\infty$ is at a distance of $f|\tan\theta|$ from the principal point and at an angle of $-\rho$ from the y-axis. A downward looking camera has a tilt angle in the range $\theta \in (\pi/2, \pi)$, for which $\tan\theta \in (-\infty, 0)$.

The horizon line $\tilde{l}^\infty$ is defined as the image of the line at infinity of planes parallel to the plane z=0. The images of the points $\tilde{V}_0=[1, 0, 0, 0]$ and $\tilde{V}_1=[0, 1, 0, 0]$ are both on the horizon line and given by $p_0$ and $p_1$, respectively. The horizon line is hence given by $\tilde{l}^\infty = p_0 \times p_1$, which evaluates to:

$$\tilde{l}^\infty = [\sin(\rho)\sin(\theta) \quad -\cos(\rho)\sin(\theta) \quad f\cos(\theta)] \quad \text{(Eq. 6)}$$

$$= \left[\sin(\rho) \quad -\cos(\rho) \quad \frac{f}{\tan(\theta)}\right] \quad \text{(Eq. 7)}$$

Thus, the horizon has a closest distance of $$\frac{f}{|\tan(\theta)|}$$

from the principal point and an angle of $-\rho$ from the x-axis.

When observing people, each foot location on the ground plane corresponds to exactly one location in the head plane, which is located at a height h and is parallel to the ground plane. For a camera matrix P=[$p_0$, $p_1$, $p_2$, $p_3$], and observing that $p_3=-zp_2$ due to the chosen setup for the world coordinate system, the homography that maps the images of ground planes to the images of the corresponding points in the head plane is in fact a homology H given by:

$$H = I - \frac{h}{z} \frac{p_2(p_0 \times p_1)^T}{p_2^T(p_0 \times p_1)}. \quad \text{(Eq. 8)}$$

Finally, since $\tilde{v}^\infty = p_2$ and $\tilde{l}^\infty = p_0 \times p_1$:

$$H = I - \frac{h}{z} \frac{\tilde{v}^\infty(\tilde{l}^\infty)^T}{(\tilde{v}^\infty)^T \tilde{l}^\infty} \quad \text{(Eq. 9)}$$

This expression maps image foot locations to corresponding image head locations. This matrix has two unit eigenvalues with eigenvectors q that fall on the horizon, i.e., $q^T \tilde{l}^\infty=0$ (two such eigenvectors are $q_0=[-\tilde{l}_z^\infty, 0, \tilde{l}_x^\infty]$ and $q_1=[-\tilde{l}_y^\infty, \tilde{l}_x^\infty, 0]$), and one eigenvalue equal to $\mu=1-h/z$ with eigenvector $\tilde{v}^\infty$.

Given a foot-to-head homology H with eigenvalues {$\mu$, 1, 1} and corresponding eigenvectors {$v_0$, $v_1$, $v_2$}, we have that $$z = \frac{h}{\mu - 1},$$

and $$\tilde{v}^\infty = v_0, \tilde{l}^\infty = v_1 \times v_2 \quad \text{(Eq. 10)}$$

The remaining camera parameters f, $\theta$ and $\rho$ can be extracted from $\tilde{v}^\infty$ and $\tilde{l}^\infty$ using equations (4) and (7).

In one embodiment, the projective camera calibration includes an autocalibration involving several parameters. The random model parameters, m=[f, $\theta$, $\rho$, z] are the quantities to estimate. The observations D={($\mu_i^d$, $\mu_i^u$), i=1, ..., N} are the noisy observations of the foot and head image coordinates for the people that stood at the unknown and random true 3D locations P={$X_i^d$, i=1, ..., N}. The true 3D head locations are not separate parameters, since they are given by $X_i^u = X_i^d + he_z$. The Euclidean coordinates of the projected $X_i^u$ and $X_i^d$ are denoted as $x_i^u$ and $x_i^d$, respectively. The noise model that defines how the noisy observations were made from the true person locations is given by zero mean normal distributions with covariances $\Sigma$={($\Sigma_i^d$, $\Sigma_i^u$), i=1, ..., N}. Hence, the foot and head observations $\mu_i^d$ and $\mu_i^u$ are assumed to be realizations from the distributions $p^d(\mu^d|x_i^d, \Sigma_i^d)=N(\mu^d; x_i^d, \Sigma_i^d)$ and $p^u(\mu^u|x_i^u, \Sigma_i^u)=N(\mu^u; x_i^u, \Sigma_i^u)$, respectively, where $N(x, \bar{x}, \Sigma)$ denotes a 2D normal distribution with mean $\bar{x}$ and covariance $\Sigma$.

In practice, shadows, occlusions, foreground-background camouflage and misclassifications commonly lead to inaccurate measurements. These measurements occur frequently enough that they need to be taken into consideration. Hence, a background noise model is incorporated into the measurement model:

$$p(\mu^d | x_i^d, \Sigma_i^d, P_o) = (1.0 - P_o)N(\mu^d; x_i^d, \Sigma_i^d) + P_o J(\mu^d; I_w, I_h), \quad \text{(Eq. 11)}$$

where $P_o$ is the probability that a measurement is an outlier, $I_w$ and $I_h$ are the width and height, respectively, of the image and $$J(x, a, b) = \begin{cases} \frac{1}{ab} & \text{if } x \in [-a/2, a/2] \times [-b/2, b/2], \\ 0 & \text{otherwise,} \end{cases}$$

a uniform prior on the image domain modeling the fact that a person can lead to an observation everywhere in the image. Hence, for the case of a complete misclassification, i.e., head and foot locations were estimated from image data that actually does not contain a person, the obtained measurements are assumed to be entirely random image locations caused by a person somewhere in the image. This model covers most of the possibilities in which unusual observations can enter the estimation process. For $x_i^u$:

$$p(\mu^u | x_i^u, \Sigma_i^u, P_o) = (1.0 - P_o)N(\mu^d; H(x_i^d, m), \Sigma_i^d) + P_o J(\mu^d; I_w, I_h), \quad \text{(Eq. 12)}$$

where $H(x_i^d; m)$ is denoted with the mapping from image location $x_i^d$ to the head image location $x_i^u$, which depends on the model parameters m. In homogeneous coordinates this mapping is simply $\tilde{x}_i^u = H\tilde{x}_i^d$, with H given by Eq. 9. Given all the quantities described above, the likelihood of data D can now be expressed as:

$$p(D|m, P, \Sigma, P_o) = \prod_{i=1}^{N} p\left(\mu^d | x_i^d, \sum_i^d, P_o\right) p\left(\mu^u | H(x_i^d, m), \sum_i^u, P_o\right). \quad \text{(Eq. 13)}$$

This likelihood depends on the variables m as well as P. A maximum likelihood estimate of this likelihood would be forced to perform the maximization with respect to both these quantities, namely $m^{ML} = \arg\max_{m,P} p(D|m,P,\Sigma,P_o)$ However, the true 3D foot locations of observed people are considered as nuisance parameters for the calibration parameters. A correct Bayesian estimation requires marginalization over these quantities. Using Bayes law and omitting the fixed parameters $\Sigma$ and $P_o$ from the argument lists, the posterior is obtained:

$$p(m, P|D) = \frac{p(D|m, P)p(m, P)}{p(D)}. \quad \text{(Eq. 14)}$$

Marginalizing over P, the following is obtained:

$$p(m|D) = \frac{p(m)}{p(D)} \int_P p(D|m, P) p(P|m) dP. \quad \text{(Eq. 15)}$$

The distribution p(m) expresses the prior knowledge about the calibration parameters, while p(P|m) expresses the prior knowledge about the location of people given m. Here, the latter prior knowledge is used to limit the space of all possible observations of people to inside the visible image (i.e., the prior probability of making an observation from a person standing outside the visible image region is zero).

The posterior, as obtained from Eq. 15, is a key equation of the estimation problem and its log-likelihood is given by:

$$L(m) = \quad \text{(Eq. 16)}$$

$$\log p(m|D) = \log p(m) + \sum_{i=1}^{N} \log \int_{x_i^d} [p(\mu^d | x_i^d, \Sigma_i^d, P_o) \cdot p(\mu^u | H(x_i^d, m), \Sigma_i^u, P_o) dX_i^d + \text{const.}$$

The m that maximizes this log-likelihood is the maximum a posteriori (MAP) estimate of the calibration parameters given the data. The evaluation of L(m) requires taking N integrals over the entire image space with the product of Eq. 12 and 11 as integrands. However, guided by the $\Sigma_i^u$ and $\Sigma_i^d$, a small approximation is made and the regions of the image where neither term under the integrals contributes to the integration is omitted. Essentially, focus is on the subregions within several Mahalanobis distance units of $\mu^d$ (with respect to $\Sigma_i^d$) and $\mu^u$ (with respect to $\Sigma_i^u$). The regions of integration do not depend on any varying quantities and can be precomputed.

Given the distribution p(m|D) the expected value of measurements $\phi(m)$ can be calculated by:

$$\bar{\phi}(m) = E[\phi(m)] = \int p(m|D)\phi(m)dm. \quad \text{(Eq. 17)}$$

Likewise, the variance of the estimates can be calculated as:

$$\sigma_{\phi(m)}^2 = E[(\bar{\phi}(m) - \phi(m))^2]. \quad \text{(Eq. 18)}$$

Taking these expectations requires integration over the distribution p(m|D), which is non-trivial.

From Eq. 15, one can not expect to perform exhaustive numerical integration over the space of all m. Hence, a Monte Carlo Markov Chain sampling can be used to obtain a representation for p(m|D) using a Metropolis sampler. Metropolis sampling obtains a set of representative samples $m_i$ of the distribution by performing a random walk starting with an initial value $m_o$ as follows:

1. Proposal Step: Propose a new sample location $m_{j+1}$ by sampling from a jump-distribution $G(m|m_j)$.
2. Acceptance Step: Set $r = p(m_{j+1})/p(m_j)$. If $r \geq 1$, accept $m_{j+1}$ otherwise accept it with probability r. If it is not accepted, set $m_{j+1} = m_j$.
3. Repeat: Until $M_0 + M$ samples have been collected.

At every iteration, an additional sample is obtained. The success of the Metropolis sampler hinges on well chosen jump distributions as well as good initial values. The Markov chain starts with $m^{MAP}$ as an initial value and in addition, a certain initial fraction $M_0$ of samples is discarded to ensure that the chain has reached a steady state.

The jump distribution is chosen as an independent normal distribution. A slight reparameterization of the calibration parameter space is performed. Instead of the focal length as one parameter, the distance $d_h$ of the horizon from the principal point is used as on the of the parameters.

Obtaining access to the distribution p(m|D) enables making statements about the uncertainty of the calibration parameters. However, from a practical standpoint there are better ways of characterizing the accuracy of the calibration. The accuracy of, for example, the focal length does not give a particularly intuitive assessment of the overall accuracy of the camera geometry for a particular application. In addition, the accuracy of measurements that depend on the calibration, e.g., the distance between points on the ground plane, the speed of targets and/or the predicted height of a person in the image, can in fact vary spatially in the image, depending on where in the image observations of people were originally taken when the calibration was performed.

Hence, it is desirable to utilize the knowledge of p(m|D) to estimate the accuracy of any measurement on an individual basis to assess whether the accuracy is sufficient. For example, assuming one makes an observation of something that could potentially be a person or a vehicle, and assuming the observation in the image that appears to be "grounded" at an image location x, one can predict where the head location $\bar{y}=E[H(x,m)]$ would be if the observation is in fact a person, using the knowledge of the camera geometry. The uncertainty of this prediction is given by:

$$\Sigma^y = E[(\bar{y} - H(x,m))(\bar{y} - H(x,m))^T] \quad \text{(Eq. 19)}$$

$$= \int p(m|D)(\bar{y} - H(x,m))(\bar{y} - H(x,m))^T dm$$

that can be approximated as:

$$= \frac{1}{M}\sum_{j=0}^{M}(\bar{y} - H(x,m_j))(\bar{y} - H(x,m_j))^T$$

The covariance $\Sigma^y$ will vary depending on where one makes the head-location prediction in the image, and one can decide whether a suitable relative accuracy is sufficient for accepting this prediction.

In one embodiment, the method includes gathering information by detecting at least one object, such as a person, on a substantially flat ground plane within field of view 95. Although the method of the present invention is described herein as detecting a person, the method can be used to detect any suitable object having a generally vertical configuration with regards to the ground plane, such as a tree, a structure, a person and/or an animal, which can be represented as a vertical line. The autocalibration of projective camera 16 is then preformed. In one embodiment, at least one measurement uncertainty is considered, as described in greater detail below, during the autocalibration of projective camera 16. A plurality of camera parameters is yielded from the projective camera calibration, namely at least one of a camera focal length, a tilt angle, a height above a ground plane and a roll angle. In one particular embodiment, a projective camera matrix for projective camera 16 is recovered from the performed autocalibration.

In one embodiment, image data is gathered to extract a two-dimensional head location estimate and a two-dimensional foot location estimate from the image data to determine a foot-to-head homography between the foot plane and the head plane in the image. The foot-to-head homography is analyzed to determine a homology having an eigenvector, two unit eigenvalues and a non-unit eigenvalue. The eigenvector and the eigenvalues are decomposed to estimate a camera focal length, a tilt angle, a height above a ground plane and a roll angle. The eigenvector and the eigenvalues are further refined to obtain a final estimate of the camera parameters.

The autocalibration of projective camera 16 includes determining a linear solution; determining a closest homology to the linear solution; and refining the linear solution to determine a nonlinear refinement. In one embodiment, determining a linear solution includes extracting a two-dimensional foot location and a corresponding two-dimensional head location from the image data. From the extracted foot location and head location, a foot-to-head homography is determined between the foot location and the corresponding head location in the image data.

To obtain an initial estimate of a ground plane homology, a direct linear transformation (DLT) algorithm for computing homographies may be employed. The DLT algorithm does not enforce any constraint on the structure of the homography it computes, and therefore the result obtained will be, in general, not a valid homology, but an arbitrary homography, which cannot be parameterized as in Eq. 9. This problem is analogue to that of computing a fundamental matrix from a linear algorithm, in which the constraint that its determinant is zero is enforced separate. In the case of a general homology, the constraint to be enforced is the equality of two of its eigenvalues. The homology parameterized in Eq. 9 not only has two equal eigenvalues, but their common value is one. However, this last observation is not meaningful in homogenous coordinates, and equality of two eigenvalues is the only real constraint to be enforced. Further, the pole-polar relationship between the horizon line and the vanishing points place an additional constraint on the homology, which under the standard assumptions for the intrinsic parameters demands that the direction of the vector starting at the principal point and ending at the vanishing point be the same as that of the normal vector of the horizon line.

In one embodiment, a head location on the head plane is obtained that corresponds to each foot location on the ground plane. The head location is positioned with respect to the corresponding foot location along a vertical line or plane at a height, h. An image is then mapped between each foot location and the corresponding head location using the foot-to-head homology. From the foot-to-head homology, the remaining camera parameters are extracted.

FIG. 3 illustrates an image 100 of a person in view 94 within the field of view of camera 16 bounded by a foreground region 204. Referring to FIG. 3, in one embodiment, a person detector processes a video stream, such as a standard video stream of 320×240 resolution. The person detector reports a rectangular region of interest (ROI) that is considered to be tight bounding boxes of the person that is detected. If the reported ROI does not border directly to any of the border of foreground region 204, which usually means that only a partial view of the person is detected, foreground region 204 is processed to extract location and uncertainty estimates of the corresponding foot and head locations. These measurements are obtained by calculating a center of mass and a second order moment of foreground region 204 in the upper-middle portion and the lower-middle portion (i.e., the leg region that yields the best cues for the center line of a person) in the ROI.

As shown in FIG. 3, an estimate foot location 210 and an estimate corresponding head location 212 of image 200 is obtained within foreground region 204 having at least a top portion 214, an upper-middle portion 216, a lower-middle portion 218 and a bottom portion 220. It is apparent to those skilled in the art and guided by the teachings herein provided that foreground region 204 may include any suitable number of portions. In order to estimate foot location 210 and corresponding head location 212 of image 200 within foreground region 204, a center of mass 225 of image 200 in foreground region 204 and a second order of moment of foreground region 204 in upper-middle portion 216 and the lower-middle portion 218 is calculated. An estimate of a location of an upper y-coordinate 230 of foreground region 204 and an estimate of a location of lower y-coordinate 232 of foreground region 204 is determined. Further, a x-coordinate of a center of mass of top portion 214 is determined to provide a x-coordinate of head location 212. The x-coordinate of head location 212 is connected with center of mass 225 and extends through lower y-coordinate 232 to determine a x-coordinate of foot location 210. Further, at least one uncertainty estimate can be obtained from the measurement uncertainty from the second order of moment and/or a covariance matrix, described above.

In one embodiment, video surveillance system 10 includes an object detector, including lens assembly 26, which is configured to process a video stream and report rectangular foreground region 204 to processor 68. As shown in FIG. 3, foreground region 204 includes at least a top portion 214, an upper-middle portion 216, a lower-middle portion 218 and a bottom portion 220, with an object, such as a person image, is at least partially positioned within foreground region 204. Processor 68 is operatively coupled to the object detector and configured to process reported foreground region 204 to extract estimated foot location estimate 210 and corresponding estimated head location estimate 212. Processor 68 performs a projective camera calibration to yield the camera parameters from the projective camera calibration.

From the linear solution, a closest homology to the linear solution is determined. In one embodiment, the foot-to-head homography is analyzed to find a first or foot-to-head homology having an eigenvector, two unit eigenvalues and a non-unit eigenvalue. The eigenvector, the two eigenvalues and the non-unit eigenvalue are decomposed to estimate the camera focal length, the camera tilt angle, the height above a ground plane and/or the camera roll angle. In one embodiment, a second or final foot-to-head homology is obtained by eigendecomposition of the first foot-to-head homology to compute the final foot-to-head homology having the same eigenvectors but altered eigenvalues. This alteration is performed on the two largest eigenvalues of the first foot-to-head homology by setting the eigenvalues to their mean value, with proper consideration for a possible change in sign. Finally, the constraint derived from the pole-polar relationship between the horizon line and the vanishing point is enforced by rotating the eigenvector corresponding to the vanishing point so it has the appropriate direction. If the eigenvectors of the homography are complex conjugate, their cross product, which yields the horizon line, according to Eq. 10, will be purely imaginary. However, the imaginary scale factor can be discarded since the horizon line is a homogeneous entity.

The eigenvector and eigenvalues are then refined to obtain a final estimate of the camera focal length, the camera tilt angle, the height above a ground plane and/or the camera roll angle. In one embodiment, the final estimate is computed using a non-linear optimization algorithm in which at least one measurement uncertainty is considered. In alternative embodiments, the method of the present invention includes suppressing a false alarm during object detection, determining at least one object three-dimensional world location based on a plurality of two-dimensional measurements, locating the at least one object over time and/or measuring a distance between objects in the field of view.

The foot location estimate and the head location estimate are noisy observations of unknown foot and head locations, respectively, in the real world. The underlying noise model is assumed to be known, although in reality only an approximate assumption about the noise contained in individual measurements can be made.

The present invention provides a method and system for camera autocalibration. Autocalibration automatically estimates internal and external camera parameters from video. Autocalibration views people as vertical objects of known height standing on a flat ground plane. This assumption makes it possible to automatically extract the viewing geometry from people detected in video. Because of many sources of noise during people localization, autocalibration performs the estimation of camera parameters under careful consideration of measurement uncertainties. The parameterization of a foot-to-head homology provides a reliable and efficient estimation of parameters, which allows closed-form estimates of initial parameter to be obtained. The system detects an object on a flat ground plane. A foot-to-head location estimation is performed. An initial foot-to-head homology is estimated. A Bayesian estimation is performed to confirm a detection of a person and/or suppress a false detection of a person, such as a detection of a lamp post or fence post, for example.

The above-described method and system for calibrating a surveillance system automatically provides a solution to the calibration from people problem utilizing a foot-to-head homology that contains the information about the camera geometry that is needed for practical applications. More specifically, the method and system facilitate obtaining calibration parameters completely automatically relying on only relatively simple image processing operations; efficiently handles significant levels of noise, as well as occurrence of outliers; and can recover statistically accurate confidence measures of calibration parameters, as well as measurements based on the calibration parameters.

Exemplary embodiments of a method and system for calibrating a surveillance system automatically are described above in detail. The method and system is not limited to the specific embodiments described herein, but rather, steps of the method and/or components of the system may be utilized independently and separately from other steps and/or components described herein. Further, the described method steps and/or system components can also be defined in, or used in combination with, other methods and/or systems, and are not limited to practice with only the method and system as described herein.

While the invention has been described in terms of various specific embodiments, those skilled in the art will recognize that the invention can be practiced with modification within the spirit and scope of the claims.

What is claimed is:

1. A method for calibrating a projective camera, said method comprising:

acquiring an observation set by detecting at least one object on a substantially flat ground plane within a field of view;

determining a noise function for the observation set based on a foot-to-head homography between a two-dimensional foot location and a corresponding two-dimensional head location the foot-to-head homography analyzed to determine a homology having an eigenvector, two unit eigenvalues, and a non-unit eigenvalue; and performing a projective camera calibration using the determined noise function.

2. A method in accordance with claim 1 wherein determining a noise function further comprises:

determining a linear solution;

determining a closest homology to the linear solution; and refining the closest homology to determine a nonlinear refinement.

3. A method in accordance with claim 2 wherein determining a closest homology to the linear solution further comprises decomposing the eigenvector and the eigenvalues to estimate at least one of a camera focal length, a tilt angle, a height above a ground plane and a roll angle.

4. A method in accordance with claim 3 wherein refining the closest homology further comprises refining the eigenvector and the eigenvalues to obtain a final estimate of at least one of the camera focal length, the tilt angle, the height above a ground plane and the roll angle.

5. A method in accordance with claim 4 wherein refining the eigenvector and the eigenvalues further comprises computing the final estimate using a non-linear optimization algorithm.

6. A method in accordance with claim 1 wherein determining a noise function further comprises determining a foot-to-head homology.

7. A method in accordance with claim 6 wherein determining a foot-to-head homology further comprises:

obtaining a plurality of foot locations on the ground plane;

obtaining a head location on a head plane corresponding to each foot location of the plurality of foot locations, the head location positioned with respect to the corresponding foot location along a vertical plane at a height; and mapping an image between each foot location and the corresponding head location using the foot-to-head homology.

8. A method in accordance with claim 7 further comprising extracting the remaining camera parameters from the foot-to-head homology.

9. A method in accordance with claim 7 further comprising estimating each foot location and a corresponding head location of an image within a foreground region having a top portion, an upper-middle portion, a lower-middle portion and a bottom portion.

10. A method in accordance with claim 9 wherein estimating each foot location and a corresponding head location of an image within a foreground region further comprises:

calculating a first center of mass of the foreground region and a second order of moment of the foreground region in the upper-middle portion and the lower-middle portion;

determining an upper y-coordinate estimate of the foreground region;

determining a lower y-coordinate estimate of the foreground region;

determining a x-coordinate of a second center of mass of the top portion to provide a x-coordinate of the head location estimate; and connecting the x-coordinate of the head location estimate with the first center of mass through the lower y-coordinate estimate to determine a x-coordinate of the foot location estimate.

11. A method in accordance with claim 10 further comprising obtaining at least one uncertainty estimate from a measurement uncertainty.

12. A method in accordance with claim 11 further comprising obtaining at least one uncertainty estimate from one of a second order of moment and a covariance matrix.

13. A method in accordance with claim 1 further comprising at least one of suppressing a false alarm during object detection, determining at least one object three-dimensional world location based on a plurality of two-dimensional measurements, locating the at least one object over time and measuring a distance between objects in the field of view.

14. A method for calibrating a projective camera, said method comprising:

acquiring image data by detecting at least one object on a ground plane within a field of view;

determining a foot-to-head homography using a vanishing point and a horizon plane; and performing a projective camera calibration using the determined foot-to-head homography, the foot-to-head homography analyzed to determine an estimated foot-to-head homology having an eigenvector, two unit eigenvalues, and a non-unit eigenvalue.

15. A method in accordance with claim 14 wherein acquiring image data further comprises extracting a two-dimensional head location estimate and a two-dimensional foot location estimate from the image data to determine the foot-to-head homography.

16. A method in accordance with claim 14 wherein performing a projection camera calibration further comprises decomposing the estimated foot-to-head homology to estimate at least one of a camera focal length, a tilt angle, a height above a ground plane and a roll angle.

17. A method in accordance with claim 16 further comprising refining the estimated foot-to-head homology to obtain a final estimate of at least one of the camera focal length, the tilt angle, the height above a ground plane and the roll angle.

18. A method in accordance with claim 16 wherein decomposing the estimated foot-to-head homology further comprises:

obtaining a plurality of foot locations on the ground plane;

obtaining a head location on a head plane corresponding to each foot location of the plurality of foot locations, the head location positioned with respect to the corresponding foot location along a vertical plane at a height; and mapping an image between each foot location and the corresponding head location using the foot-to-head homology.

19. A surveillance system comprising:

an object detector configured to process a video stream and report a rectangular foreground region; and a processor configured to:

process the reported foreground region to extract a foot location estimate on a ground plane and a corresponding head location estimate, the extracted estimates based on a foot-to-head homology having an eigenvector, two unit eigenvalues, and a non-unit eigenvalue;

perform a projective camera calibration based on at least one of the foot location estimate and the head location estimate; and output a plurality of camera parameters based on the projective camera calibration.

* * * * *